United States Patent [19]

Andrus

[11] 4,137,781

[45] Feb. 6, 1979

[54] DEVICE FOR MEASURING THE STATIC PRESSURE OF A MOVING FLUID

[75] Inventor: John R. Andrus, Missouri City, Tex.

[73] Assignee: Waukesha-Pearce Industries, Inc., Houston, Tex.

[21] Appl. No.: 848,551

[22] Filed: Nov. 4, 1977

[51] Int. Cl.² .................... G01L 7/00; G01W 1/02
[52] U.S. Cl. .................................. 73/707; 73/189
[58] Field of Search ............... 73/212, 188, 189, 182, 73/707

[56] References Cited

U.S. PATENT DOCUMENTS

| | | | |
|---|---|---|---|
| 1,694,838 | 12/1928 | Bayha | 73/707 |
| 2,486,133 | 10/1949 | Egger | 73/707 |
| 2,662,402 | 12/1953 | Ince, Jr. et al. | 73/212 |

*Primary Examiner*—Donald O. Woodiel
*Attorney, Agent, or Firm*—Fulbright & Jaworski

[57] ABSTRACT

A directional device operating similar to a wind vane has a hollow vertical shaft which is journalled in a housing containing three chambers in communication. An air inlet port is located on the side of the directional vane and communicates through the hollow journalled shaft into the first chamber. A small aperture in the wall between the first and second chambers dampens the movement of the fluid flow from chamber 1 to chamber 2. A conventional baffle separates the second and third chambers and simultaneously allows fluid flow from the second to the third chamber while further damping the fluid flow to such a point that the fluid in the third chamber is substantially static. The third chamber is in communication with a differential pressure gauge which then compares the static pressure in chamber 3 with another pressure source. Because the air inlet port is always maintained perpendicular to the wind direction, pulsations and surges of air pressure through the air inlet port caused by wind shifts are greatly reduced, and the fluid is damped twice before entering the third chamber as a static fluid.

2 Claims, 2 Drawing Figures

DEVICE FOR MEASURING THE STATIC PRESSURE OF A MOVING FLUID

BACKGROUND OF THE INVENTION

Offshore petroleum operations frequently employ a shack or shed on the drilling/production platform which houses any number of machines, equipment and other electrical devices necessary for the maintenance, operation and safety of the drilling platform. Any number of inflammable hydrocarbon vapors are present on the drilling/production rig and can easily be ignited or combusted by electrical arcing, cigarette lighting or welding operations. In an attempt to eliminate the above-mentioned fire hazards, it has become common practice to maintain the interior of the shed housing the equipment and machinery at a pressure greater than the pressure outside the shack. Therefore, the greater pressure inside the shack insures that none of the inflammable vapors can enter into the shack and thereby become combusted or inflamed.

In an attempt to increase further the safety of the drilling platform environment, an automatic shut-off switch to all the associated machinery has been connected to a differential pressure gauge such that when the pressure inside the shack relative to that outside the shack is reduced below a certain level, for example equal to that of the outside pressure, all the associated equipment is immediately cut off. In order to compare accurately the pressure inside the shack with that outside the shack, static pressure must be measured in both instances. In the past, static air inlet ports have been projected from within the shack through the roof or wall thereof in order to communicate with the outside environment. Consequently, in a no wind situation accurate readings are obtained. The presence of a wind, however, causes the sum of both the dynamic and static pressures to be read erroneously as static pressure. If a wind develops such that the static air port is on the upwind side of the shack, the actual pressure measured is greater than the true static pressure inasmuch as both static and dynamic pressures are being read on the pressure gauge. A false alarm arises, because the outside pressure is erroneously read high, thus reducing the measured ratio of the inside pressure to the outside pressure to a smaller fraction and giving a false "low inside pressure" reading. Periods of up to three hours are frequently required to reactivate all the equipment which has needlessly been cut off.

Similarly, if the static air port is located downwind, a low pressure area surrounding the static air port frequently occurs and pressures lower than the true static pressure will be read outside the shack. In such a situation the denominator (outside pressure) is reduced thereby increasing the ratio of inside to outside pressure. Accordingly, the actual inside pressure can fall below the safe level and produce a hazardous situation.

SUMMARY OF THE INVENTION

The present invention employs a directional device operating on a principle similar to a weather vane. A static air port is located on an elongated member which has fins at one end and an adjustable weight on the other end. Accordingly, the elongated member, or wind vane, tends to remain aligned parallel to the wind direction irrespective of any wind shifts. Similarly, the static port tends to remain at a constant angle relative to the wind direction thereby eliminating pulsations and surges of wind on the air port caused by shifts in the wind.

A hollow shaft having one end secured perpendicularly to the finned member is journalled at the other end into a housing containing three separate chambers. The hollow shaft communicates the air inlet port with the first chamber allowing fluid flow through the air inlet port into the chamber. A small aperture in the wall separating the first chamber from the second chamber damps the fluid flow from the first to the second chamber thereby reducing the dynamic pressure exerted by the fluid as it moves from chamber 1 to chamber 2. A conventional wind baffle separates the second chamber from the third chamber. The baffle allows the once-damped fluid in the second chamber to communicate with the third chamber. At the same time, the baffle deflects the communicating fluid in a multitude of directions and slows the communicating fluid to the level where the resulting fluid in the third chamber is substantially free of any dynamic pressure, and therefore truly a static fluid. The static air in the third chamber is then communicated to a differential pressure gauge which reads and compares a true static pressure outside the shack as measured from the third chamber of the present invention and the static pressure inside the shack. Pulsations and surges of outside air into the air inlet port are greatly reduced because the air inlet port is maintained at a constant angle relative to the wind direction. Furthermore, the first damping means between chambers 1 and 2 and the second damping means between chambers 2 and 3 effectively eliminate any remaining pulsations or surges thereby producing a truly static fluid in the third chamber. Accordingly, a true differential pressure comparison is constantly obtained as between the air inside the shack and that outside the shack.

It is therefore an object of the present invention to provide a device for measuring static air pressure in a moving fluid, for example air, such that the air inlet port is maintained at a reasonably constant angle to the direction of the fluid.

Another object of the present invention is to provide additional means for damping a fluid such as air communicating through an air inlet port such that a true static pressure can be achieved for purposes of the comparison of the static pressure with another pressure source.

Yet another object of the present invention is to provide an apparatus for measuring true static pressure in a moving fluid which is suitable for mounting on a building or shack such as those frequently utilized on offshore drilling platforms.

A still further object of the present invention is to provide a device which can measure a true static pressure outside a shack situated on an offshore drilling platform, continuously compare the outside static pressure with the pressure inside the shack in such a manner that an accurate comparison of the two static pressures is uniformly achieved and wind surges and wind shifts outside the shack do not produce false high or low outside pressure readings which in turn cause erroneous unsafe or safe differential pressure readings respectively.

These and other objects and advantages of the present invention will become apparent upon reading of the specification, drawings and claims.

DETAILED DESCRIPTION OF THE PREFERRED EMBODIMENT

Figure 1:
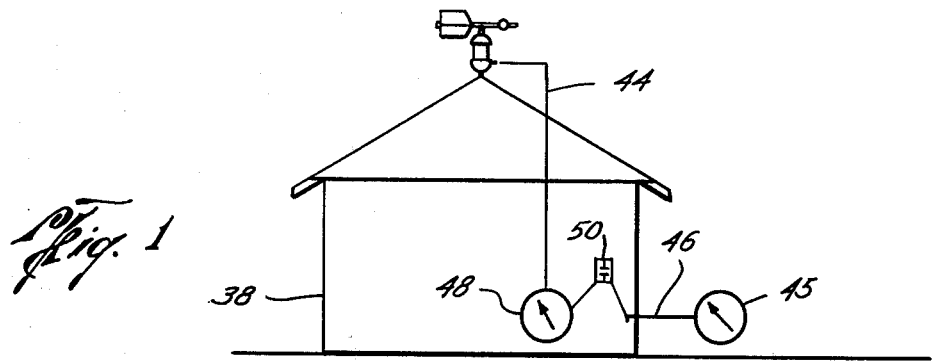
FIG. 1 is an elevational view end section of the static pressure measuring device.

As shown in FIG. 1, an elongated member 10 is exposed to a fluid stream (not shown), for example an air stream, and has at least one fin member 12 secured in proximity to one end of the elongated member 10 and projecting radially outwardly therefrom. The fin member resultingly tends to align the elongated member 10 parallel to the direction of the fluid stream regardless of any changes in direction of the fluid stream. A weighted member 16, for example a sliding counterweight, can be adjustably secured in proximity to the other end of the elongated member 10 in order to further align the elongated member 10 parallel to the direction of the air stream while at the same time minimizing any oscillations or other transitory movements of the member 10.

A hollow shaft 18, having a passageway 20 extending longitudinally therethrough, is secured at one end to the member 10 and is journalled at the other end to a housing 2 by means of a bearing housing having upper bearings 24 and lower bearings 26. A fluid inlet member 14, for example an air inlet port, is disposed on the member 10 and communicates the fluid in the moving stream to the passageway 20 of the hollow shaft 18. Preferably, the fluid inlet member is disposed on the member 10 near the axis of rotation of the hollow shaft 18 so as to minimize the translation of the fluid inlet member 14 within the fluid stream thereby minimizing dynamic pressure of the fluid stream within the fluid inlet member 10.

As shown in FIG. 1, the bearing housing 22 secured to the housing 2 rotatingly receives the hollow shaft 18 in such a manner that the hollow shaft 18 is substantially vertical, the elongated member 10 is substantially horizontal and is free to rotate 360° in response to the direction of the fluid flow.

The housing 2 contains therein three chambers, a first chamber 4, a second chamber 6 and a third chamber 8. The end of the hollow shaft 18 opposite the end secured to the elongated member 10 projects into and communicates with the interior of the first chamber 4. Consequently, the moving fluid at the fluid inlet member 14 can communicate with the interior of the first chamber 4. The first chamber 4 is partitioned from the second chamber 6 by means of a wall 27 which can easily be positioned in the housing 2 by one or more stops 30. An aperture 28 which is small in cross-sectional area as compared to the surface area of the wall 27 communicates the first chamber 4 with the second chamber 6. When the cross-sectional area of the aperture 28 is sufficiently small in relation to the area of the wall 27, the aperture 28 not only communicates the fluid in the first chamber 4 with the second chamber 6, but also serves to damp the rate of fluid flow from the first chamber 4 into the second chamber 6. A baffle means 32, for example a conventional microphone acoustical baffle, separates the second chamber 6 from the third chamber 8. The baffle means 32 both communicates the fluid in the second chamber 6 with the third chamber 8 while at the same time multi-directionally deviates the flow of the fluid, thereby damping for a second time the fluid flow within the housing 2. The baffle means 32 can be secured to the housing 2 by any appropriate means, for example one or more stops 34.

For purposes of economy, the housing 2 need not be an integral unit. A simple and economical way to manufacture the housing is to provide a unit of polyvinyl chloride pipe coupling 31 which is capped at both ends by insertion into a pair of polyvinyl chloride pipe caps 29. The pipe coupling 31 can either be threadedly or fittingly received by the pipe caps 29. Those skilled in the art and familiar with plastic-like materials will realize that plastic-like materials tend to deteriorate upon prolonged exposure to sunlight. The housing 2, therefore, may appropriately be manufactured from any suitable nonplastic-like material so long as the material is non-corrosive and therefore satisfactory for operations on offshore platforms which occur in corrosive salt air.

Those skilled in the art will realize if the elongated member 10 has a chamber 11 therein which is enclosed at both ends of the member 10, the fluid inlet port 14 more efficiently damps the fluid flow into the passageway 20 than if the passageway 20 communicates with the fluid inlet member 14 without the presence of the enclosed chamber 11. The principle involved with the fluid inlet member 14 in combination with the enclosed chamber 11 is similar to that of the aperture 28 in combination with the first chamber 4 and the second chamber 6.

Figure 2:
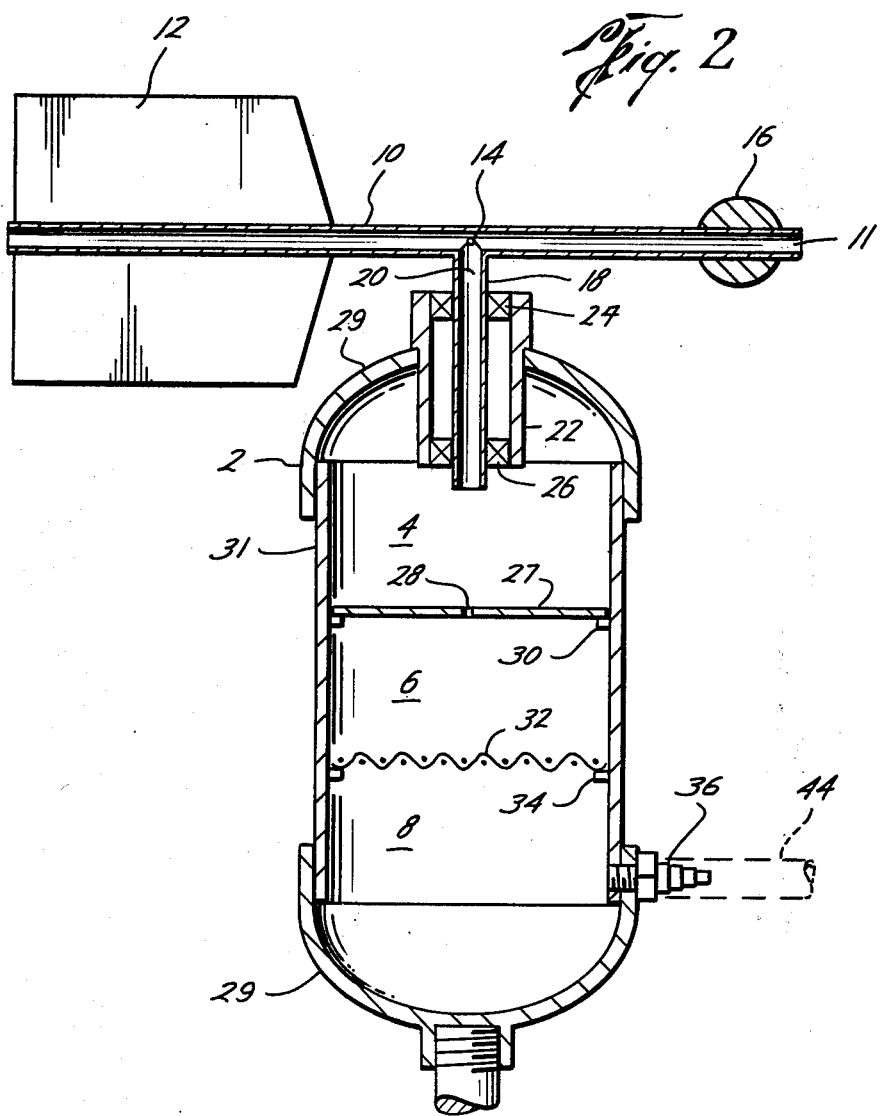
FIG. 2 is an environmental view showing the employment of the present invention on a shack situated on an offshore drilling platform.

Those skilled in the art will realize that the present invention as described and claimed herein effectively converts the moving fluid having both dynamic and static pressures into a fluid in the third chamber 8 which is substantially still and, therefore, possesses only a static pressure. Consequently, a pressure measuring device 48 as shown in FIG. 2 can be connected to and in communication with the static fluid within the third chamber 8. A suitable method for communicating the pressure gauge 48 with the third chamber 8 is by means of a conventional hose connector 36 as shown in FIG. 1 which receives a tube or air hose 44 as shown in FIG. 2 which in turn communicates with the pressure measuring means or pressure gauge 48.

Under operating conditions, the present invention is employed according to FIG. 2. A shed 38 standing on an oil platform (not shown) has an inside static pressure $P_1$ and an outside pressure $P_2$. For reasons of safety, it is desirable to maintain $P_1$ at a higher level than $P_2$ thereby producing an overpressure inside the shed such that combustible hydrocarbon vapors present on the drilling platform will not enter into the shed 38 and be ignited. Accordingly, the ratio of $P_1$ divided by $P_2$ must continually be measured and calculated to insure that the overpressure inside the shed does not fall below a certain minimum satisfactory level. The present invention is mounted by any satisfactory method onto the exterior of the shed 38 as shown in FIG. 2. The static pressure exerted by the static air within the third chamber 8 of the present invention is communicated by a tube or air hose 44 to a differential pressure measuring gauge 48. Similarly, the static air inside the shed 38 is communicated by any conventional means such as an inlet 45 in communication with an air hose 46 to the pressure differential measuring device 48. The pressure differential measuring device 48 is in turn connected to an automatic cut off switch 50 which when activated breaks the circuits leading to any specified number of machines and equipment within the shed 38. Accordingly, if the pressure inside the shed 38 is reduced to a point wherein the ratio of $P_1/P_2$ is less than the desired fraction, the cutoff switch 50 is activated thereby removing any necessary machinery from the line.

It is understood that preferred embodiments of the present invention have been disclosed in the specification, drawings and claimed hereinafter and that any number of modifications, adaptations or combinations of apparatus are covered and included both within the scope and spirit of the present invention and are included within the claims appended hereto.

What is claimed is:

1. A device for measuring the static pressure of a moving fluid comprising:
    (a) a housing including therein a first chamber, a second chamber in communication through a wall with said first chamber and a third chamber in communication with said second chamber;
    (b) an enclosed hollow elongated member exposed to the moving fluid, having one or more fins in proximity to one end of said elongated member projecting radially outwardly therefrom thereby tending to align the longitudinal axis of the elongated member parallel to the direction of movement of said fluid;
    (c) a fluid inlet disposed in the elongated member normal to the longitudinal axis thereof and communicating the interior of said elongated member to the moving fluid;
    (d) a hollow shaft, one end of which is journalled to the housing, and the other end of which is secured normally to the elongated member communicating the fluid inlet port with the first chamber of the housing so that the moving fluid can communicate with the said first chamber;
    (e) an aperture in the wall between the first and second chambers, said aperture having a small cross-sectional area in comparison to the area of said wall thereby communicating the fluid in the first chamber to the second chamber such that fluid movement from the first chamber to the second chamber is substantially damped;
    (f) an acoustical baffle means communicating the fluid of the second chamber with the third chamber such that the fluid flow from the second chamber into the third chamber is further damped and the fluid in the third chamber becomes substantially static;
    (g) a pressure gauge; and
    (h) a hose communicating the static fluid of the third chamber to the pressure gauge.

2. A device for measuring the static pressure of a moving fluid comprising:
    (a) an elongated member having two ends;
    (b) an orifice in the elongated member, said orifice in communication with the moving fluid and aligned substantially normally to the longitudinal axis of the elongated member;
    (c) means responsive to the moving fluid for maintaining the orifice of (b) substantially normal to the direction of movement of said fluid, said means comprising at least one fin member disposed at one end of the elongated member, said fin member in axial alignment with said elongated member and projecting radially outwardly therefrom, and a weighted member disposed in proximity to the other end of the elongated member thereby tending to align the longitudinal axis of the elongated member parallel to the direction of the moving fluid and to align the orifice normally to said moving fluid;
    (d) a housing including a first chamber, a second chamber, and a third chamber;
    (e) a hollow shaft normally secured at one end to the elongated member, the other end of said shaft journalled to the housing (d), and communicating the fluid at the orifice through the elongated member and hollow shaft to the first chamber;
    (f) means to communicate the fluid in the orifice of (b) with the first chamber of (d);
    (g) a first fluid damping means disposed between the first and second chambers; said means communicating the fluid in the first chamber through the damping means to the second chamber of (d); and
    (h) a second damping means between the second chamber and the third chamber; said means communicating the fluid of the second chamber through the second damping means to the third chamber of (d) whereby the fluid in the third chamber is substantially static.

* * * * *